United States Patent
Huang et al.

(10) Patent No.: US 7,588,360 B2
(45) Date of Patent: Sep. 15, 2009

(54) LED LIGHTING EQUIPMENT AND HEAT RADIATING STRUCTURE

(76) Inventors: Yao Hui Huang, 4F, No. 566, Sec. 7, Chung Hsiao Rd., Taipei (TW); Guan Ming Chen, 5F, No. 6, Lane 25, Guotai Street, Banciao City, Taipei Hsien (TW)

( * ) Notice: Subject to any disclaimer, the term of this patent is extended or adjusted under 35 U.S.C. 154(b) by 58 days.

(21) Appl. No.: 11/957,413

(22) Filed: Dec. 15, 2007

(65) Prior Publication Data

US 2009/0154173 A1     Jun. 18, 2009

(51) Int. Cl.
*H01L 33/00* (2006.01)

(52) U.S. Cl. .................. 362/555; 362/218; 362/223; 362/235; 362/245; 362/249.01; 362/249.02; 362/294; 362/311.01; 362/327; 362/800

(58) Field of Classification Search .......... 362/217–218, 362/223, 235, 244–245, 249, 294, 311, 326–327, 362/551, 555, 582, 800, 249.01, 249.02, 362/311.01

See application file for complete search history.

(56) References Cited

U.S. PATENT DOCUMENTS 7,478,936 B2 * 1/2009 Chen .................... 362/555

* cited by examiner

*Primary Examiner*—Jason Moon Han
(74) *Attorney, Agent, or Firm*—Ming Chow; Sinorica, LLC

(57) ABSTRACT

The present invention relates generally to an LED lighting equipment and heat radiating structure, which primarily consists of a lamp holder/bracket and a heat conduction base, wherein, the lamp holder/bracket comprising a light-transferring pole and an LED circuit board, and thereat, an LED lamp is fastened via the LED circuit board, so that the light emitted from light source could be reflected outward by a light reflective film installed inside the light-transferring pole, to generate light for the purpose of illumination; in addition, said heat conduction base is combined with the LED circuit board, and thereat the top of the heat conductor is pushing against a heat-transfer material extending from the back of the LED lamp, in order to absorb the high temperature generated by the LED lamp, afterward, high temperature would be rapidly radiated via an outer edge of the main body of the heat conduction base, and hence, achieving the effects of energy saving and safety with function of temperature reduction thereof.

10 Claims, 11 Drawing Sheets

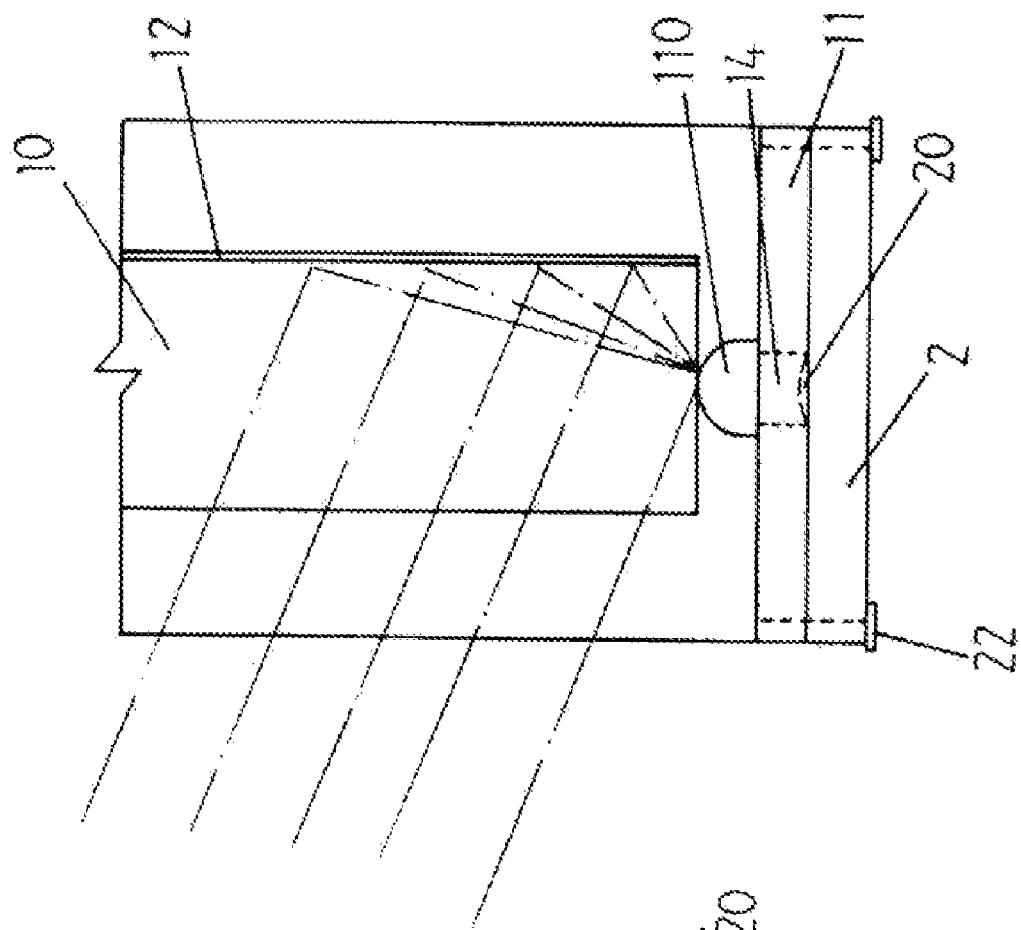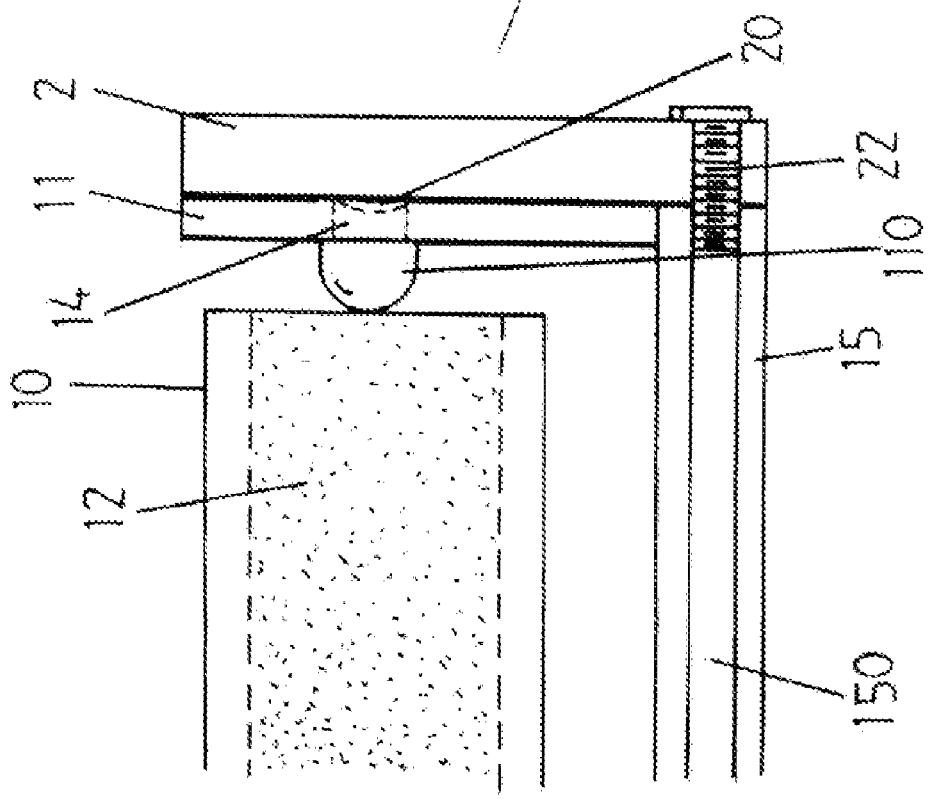

US 7,588,360 B2

LED LIGHTING EQUIPMENT AND HEAT RADIATING STRUCTURE

BACKGROUND OF THE INVENTION

1. Field of the Invention

The present invention relates generally to an LED lighting equipment and heat radiating structure, which primarily consists of a lamp holder/bracket and a heat conduction base, wherein, the lamp holder/bracket comprising a light-transferring pole and an LED circuit board.

2. The Prior Arts

General lighting equipment usually utilizes the fluorescent lamp or the bulb as its lighting source. However, due to high electricity consumption, these kind of lighting sources are impossible to meet the global requirements for energy-saving. There are several new designs related to the energy-saving bulbs, but, the electricity consumption effect of the energy-saving bulbs still can not satisfy the current situation while the people is facing a great shortage of energy resources. With the requirements, we might say the energy-saving bulb is not the optimum lighting equipment, and hence, people started using the LED lamp to replace the energy-saving bulb. The LED lamp utilizes a light reflective film C of a light-transferring pole B1 to generate light source (such as U.S. Pat. No. 7,228,052), however, it generates extreme high temperature while using the high effective LED lamp. In light of U.S. Pat. No. 7,228,052, it utilized the high effective LED lamp without any design of heat radiating structure for the lamp itself at all. The usage of U.S. Pat. No. 7,228,052 could not only resolve the problem of high temperatures, but cannot improve the service life of the LED lamp that leads to several defects on the product as described by the particular patent.

SUMMARY OF THE INVENTION

The present invention provides an LED lighting equipment and heat radiating structure, which primarily consists of a lamp holder/bracket and a heat conduction base. The lamp holder/bracket comprises of a light-transferring pole and an LED circuit board. An LED lamp is fastened on the LED circuit board for generating an electrical channel so that the light emitted from a light source could be reflected outward by a light reflective film installed inside the light-transferring pole for generating light for the purpose of illumination. The main body of said heat conduction base could be made from the material with an excellent heat radiating effect, such as aluminum, or ceramics, or copper metal, or aluminum baseboard, furthermore. The LED circuit board is able to be combined with both sides of the main body of the heat conduction base in such a way that it would push the heat conductor upward against a heat-transfer material extending from the back of the LED lamp, in order to directly absorb the high temperature generated by the LED lamp, and afterward, high temperature would be rapidly radiated via an outer edge of the main body of the heat conduction base, and hence, achieving the effects of energy saving and safety with function of temperature reduction thereof.

The primary objective of the present invention lies in providing an LED lighting equipment with function of rapid heat radiating.

The secondary objective of the present invention is to provide an LED lighting equipment with enhancing illumination.

Another objective of the present invention is to provide an LED Lighting Equipment capable of improving the service life of an LED lamp.

BRIEF DESCRIPTION OF THE DRAWINGS

The present invention will be apparent to those skilled in the art by reading the following detailed description of a preferred embodiment thereof, with reference to the attached drawings, in which:

FIG. 4 is an assembly exploded view of the present invention;

FIG. 5 is a schematic view showing reflection function of the present invention;

DETAILED DESCRIPTION OF THE PREFERRED EMBODIMENT

Figure 1:
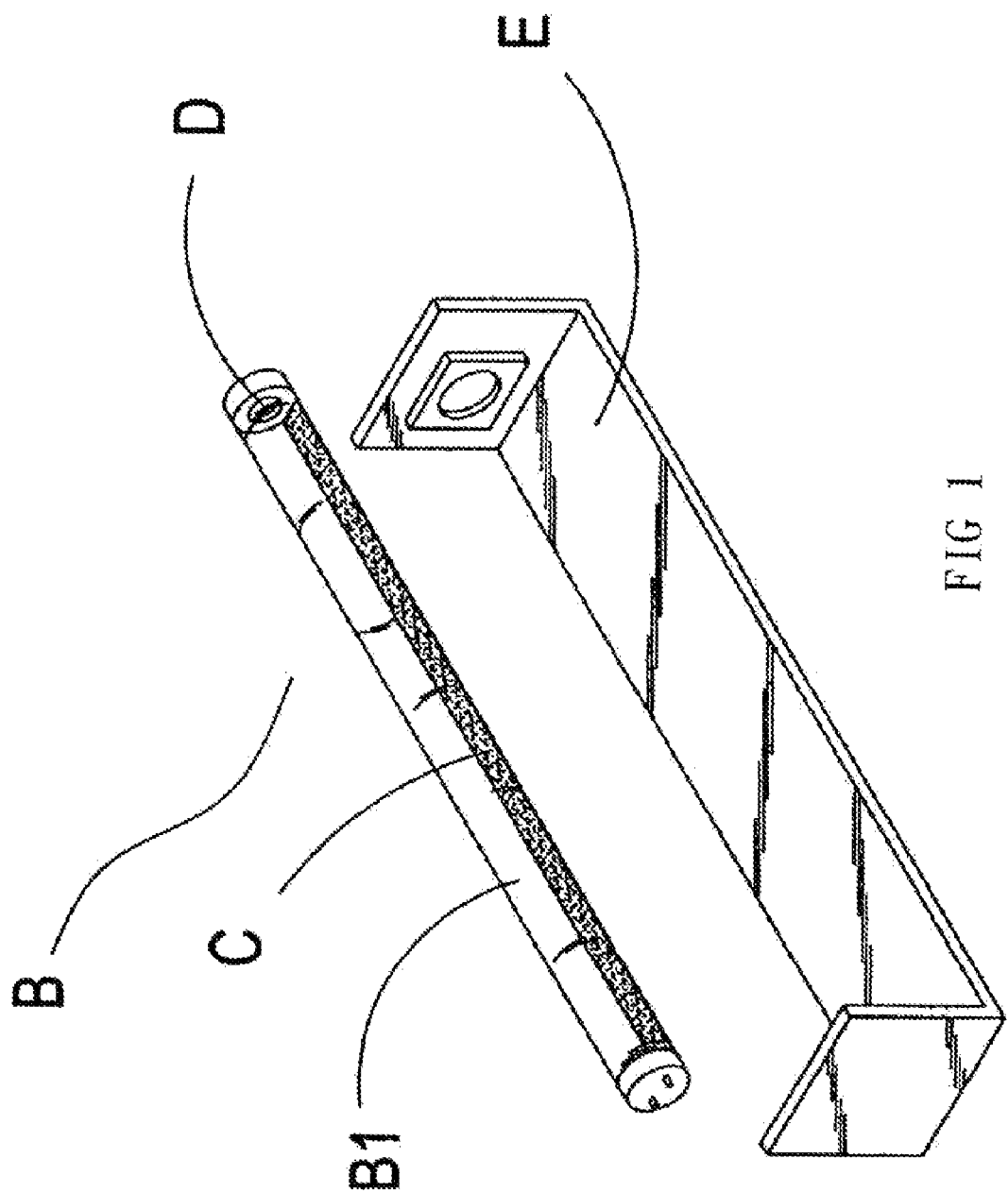
FIG. 1 is a stereogram of U.S. Pat. No. 7,228,052.
Figure 2:
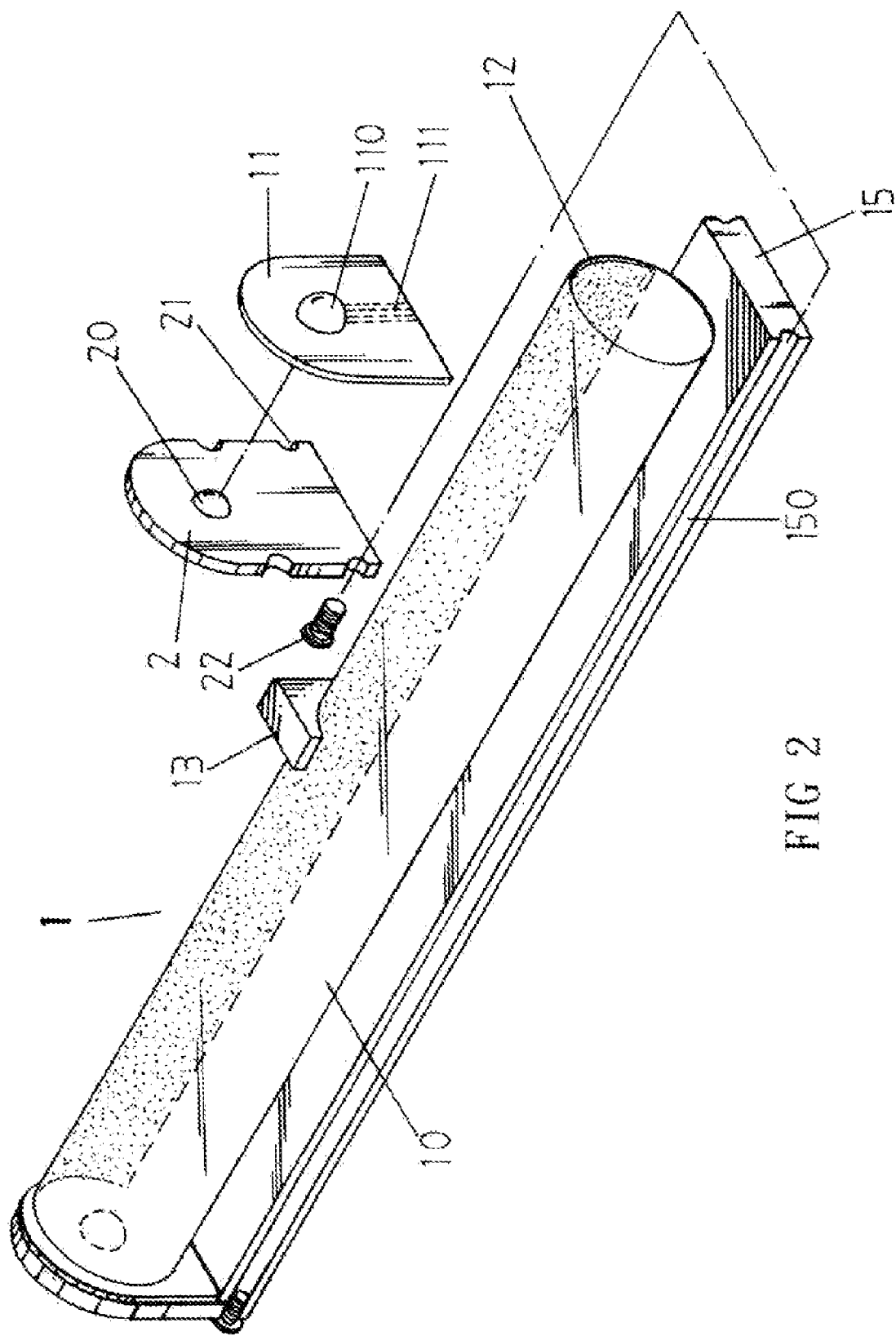
FIG. 2 is a stereographic exploded view of the present invention.
Figure 3:
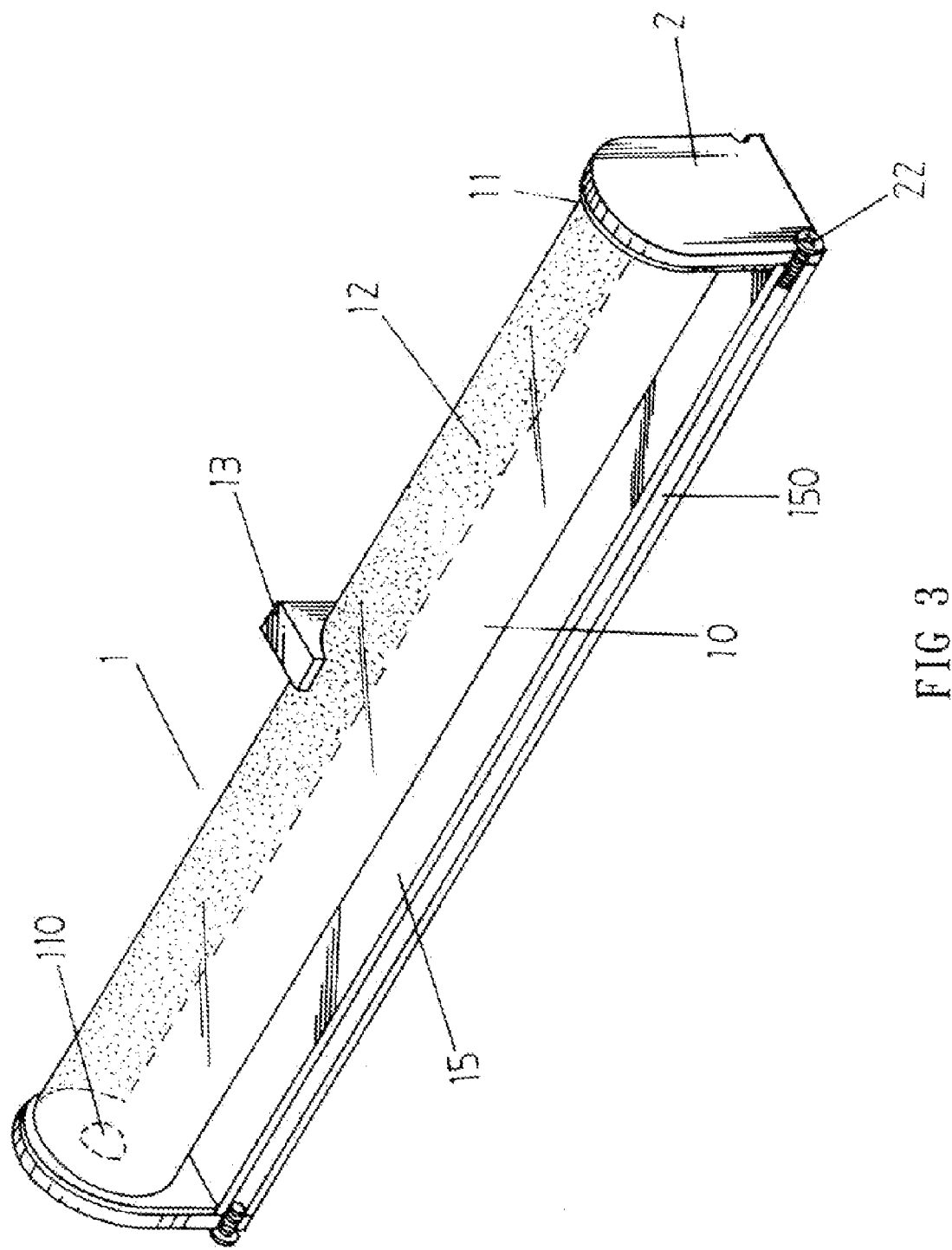
FIG. 3 is a stereographic assembly view of the present invention.

With reference to FIGS. 2 and 3, the present invention comprises of two primary portions, the lamp holder/bracket 1 and heat conduction base 2, wherein, the lamp holder/bracket 1 comprising of a light-transferring pole 10 and an LED circuit board 11, and the light-transferring pole 10 is a transparent cylinder structure locating at the back end of said light-transferring pole 10. A one-piece molding structure connected directly to a light reflective film 12, which is installed inside the transparent cylinder. The light-transferring pole 10 utilizing a clinch 13 to fasten the base 15 of said heat conduction base 2. There are circuits 111 (i.e. an electrical channel) set up on the LED circuit board 11, wherein one end of the circuits 111 is connected upward to an LED lamp 110, and the other end of said circuits 111 is connected to a power supply, so as to provide the LED lamp 110 with electric current, and hence to generate light source accordingly. At the back end of said LED lamp 110, there is a heat-transfer material 14 extending to the external edge of said LED circuit board 11, where a cavity is formed thereto. The LED circuit board 11 is being combined with the heat conduction base 2 fastened at two sides of the base 15 in such a way that a heat conductor 20 installed at the heat conduction base 2 will be inserted into the cavity of heat-transfer material 14, where it will be totally pushed upward against the heat-transfer material 14 extending from the back end of the LED lamp 110, so that it will make the LED circuit board 11 combine with the heat conduction base 2 (as shown in FIG. 4), afterward, it is able to use screws 22 to fasten, through gaps 21 at the heat conduction base 2, two trench 150 located at two ends of the base 15, so that the lighting equipment structure is now being assembled completely.

Figure 6:
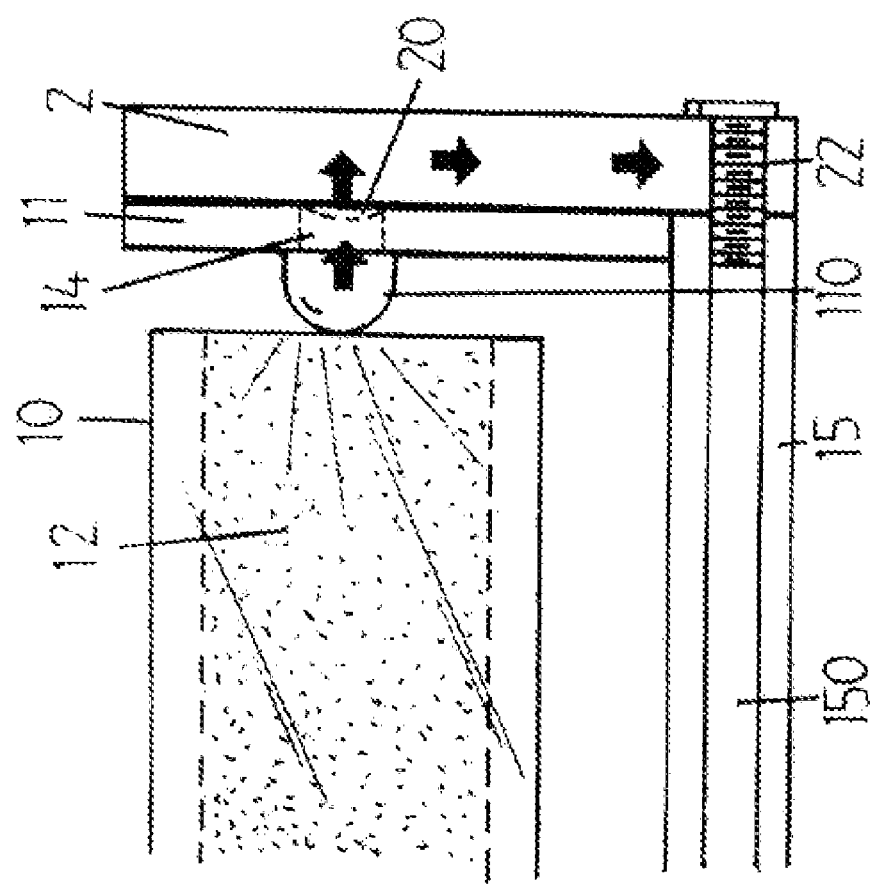
FIG. 6 is a schematic view showing heat radiating function of the present invention.
Figure 7:
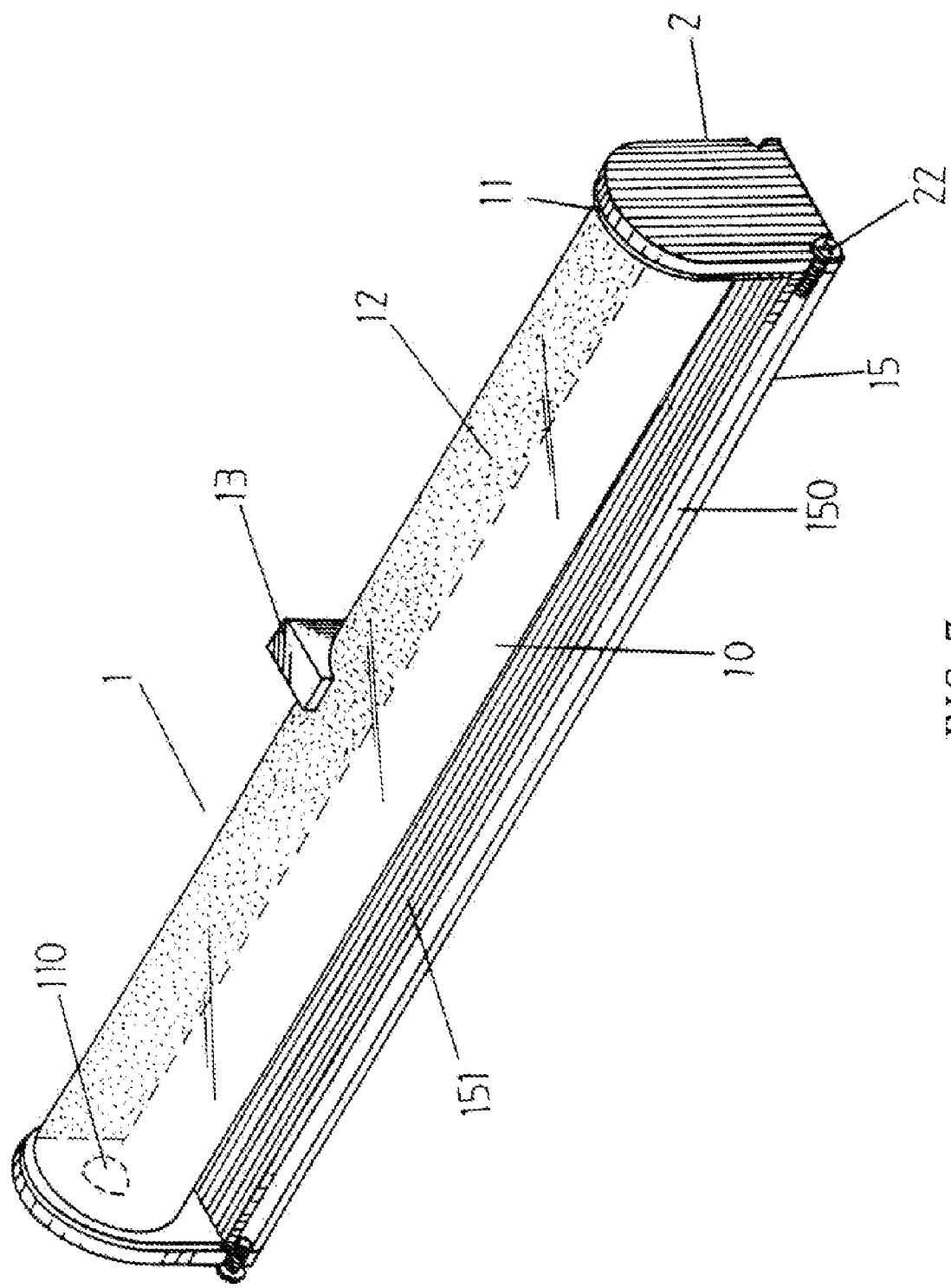
FIG. 7 is a schematic view showing another preferred embodiment of heat radiating base in accordance with the present invention.

While referring to FIGS. 5 and 6, when electric power is being supplied to the LED lamp 110 through the circuits 111 in order to illuminate light, the illuminated light will be radiated while light is being refracted by the light reflective film 12 of the light-transferring pole 10 for the purpose of illumination, meanwhile, high temperature generated by the LED lamp 110 would be transferred by the heat-transfer material 14 at the back end, through the heat conductor 20 of the heat conduction base 2 and then transferred to the base 15 of the heat conduction base 2, and thereat, due to both the heat conductor 20 and the base 15 are made from aluminum material or ceramics or copper metal or aluminum baseboard, which has an excellent heat radiating function. Therefore, high temperatures transferred by the heat conductor 20 will be absorbed by the heat conduction base 2 and its combined base 15 and hence heat will be radiated rapidly. Under this circumstance, the temperatures at the main body of the LED lamp would be dropped to lowest level, in order to achieve a protection effect, and hence prolong the service life of the LED lamp consequently.

In order to further enhance the efficiency of heat radiation, the present invention develops heat lines 151 on the surfaces of the heat conduction base 2 and its combined base 15, so that the heat radiating area will be enlarged and hence high temperature generated by the LED lamp 110 will be radiated as quickly as possible.

Figure 8:
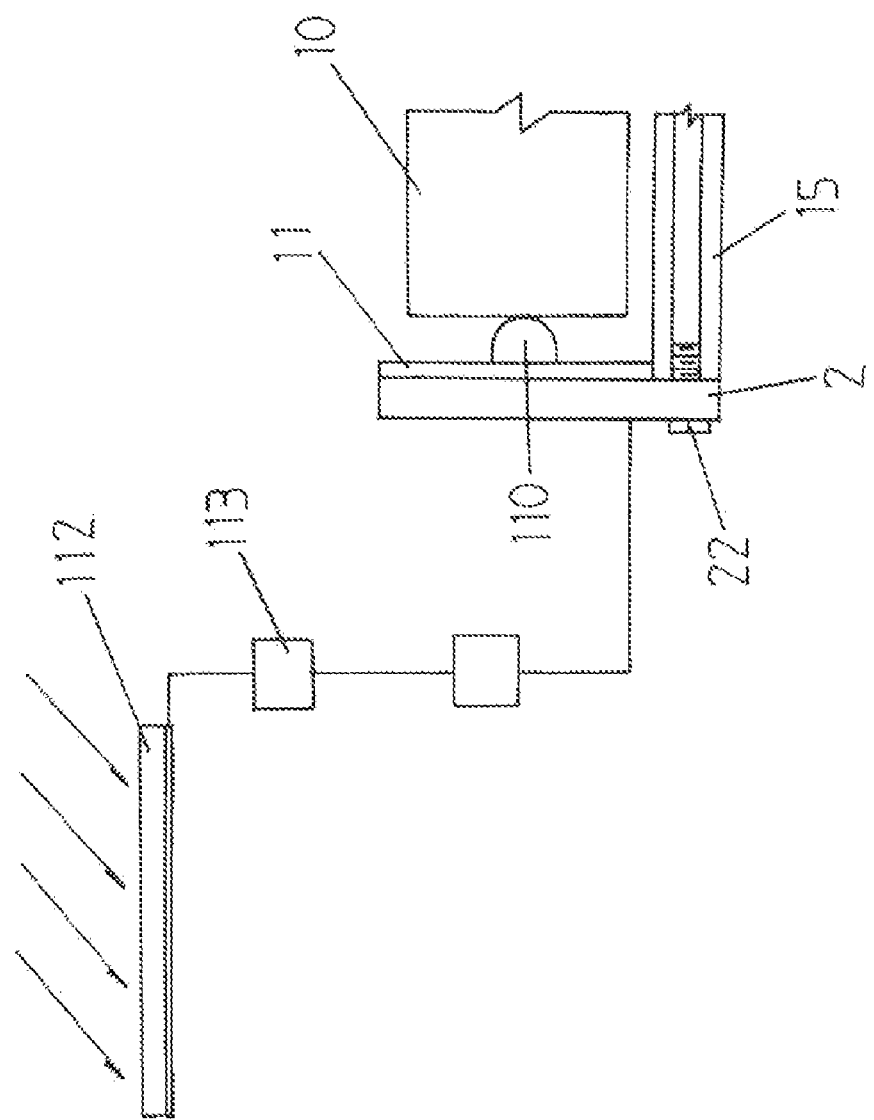
FIG. 8 is a schematic view showing the details of solar application in accordance with the present invention.

For achieving another objective of the present invention, i.e. energy saving, the present invention has set up an electrical channel between the circuits 111 of the LED circuit board 11 and a solar energy plate 112 (as shown in FIG. 8). The solar energy collected by the solar energy plate 112 is converted by a solar energy converter 113 into electrical energy, and then supplied to the LED circuit board 11 for making the LED lamp 110 to be lighted up in addition to an objective of energy saving.

Figure 9:
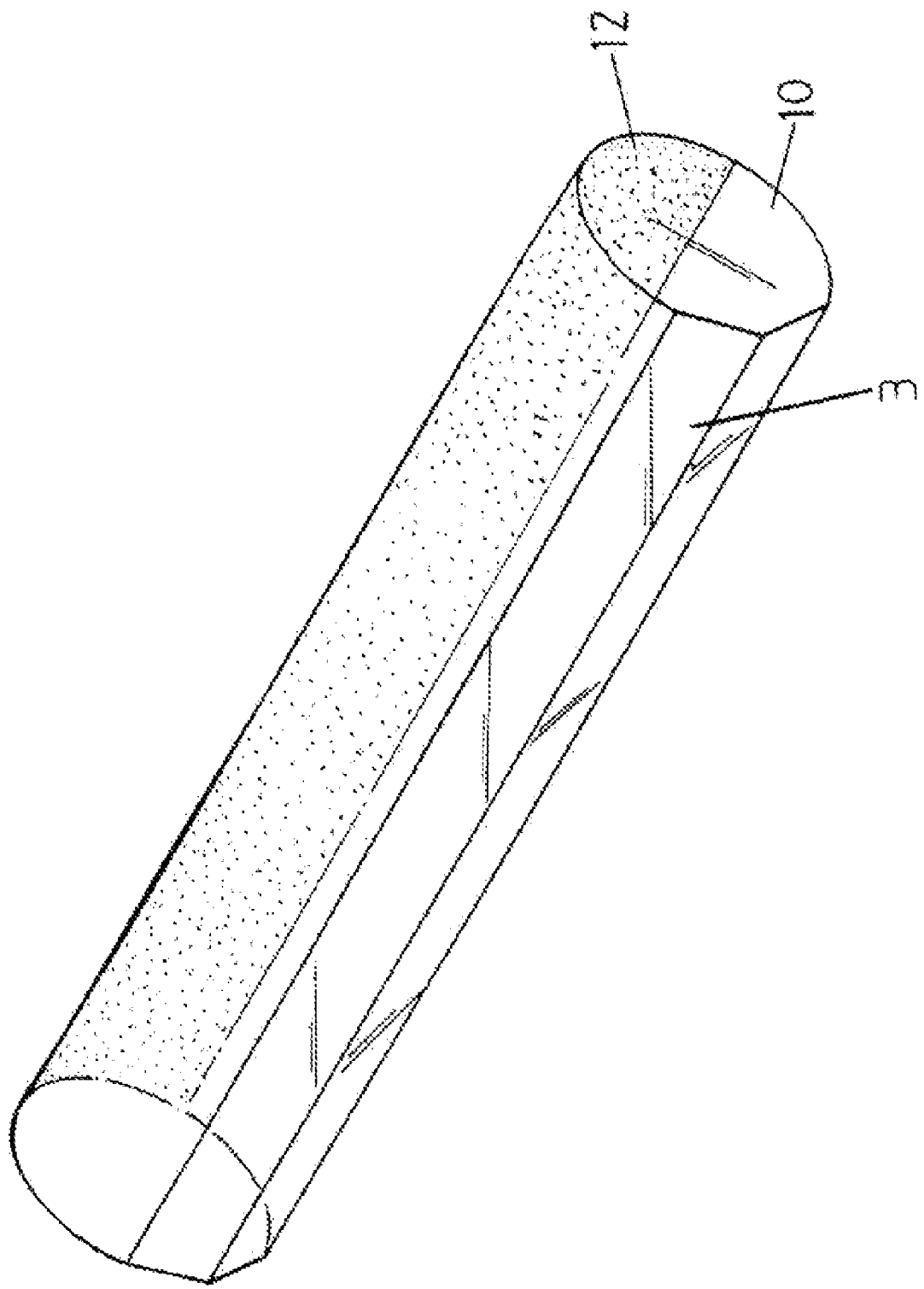
FIG. 9 is a schematic view showing another preferred embodiment of light reflection pole in accordance with the present invention.

FIG. 9 shows another preferred embodiment of the light reflection pole 10 in accordance with the present invention, wherein, a plurality of refractive angles 3 structure are formed at the corresponding cylinder of the light reflective film 12 of the light-transferring pole 10 and in this way it is able to refract and radiate light reflected by said light reflective film 12 and hence enhancing the effect of illumination.

Figure 10:
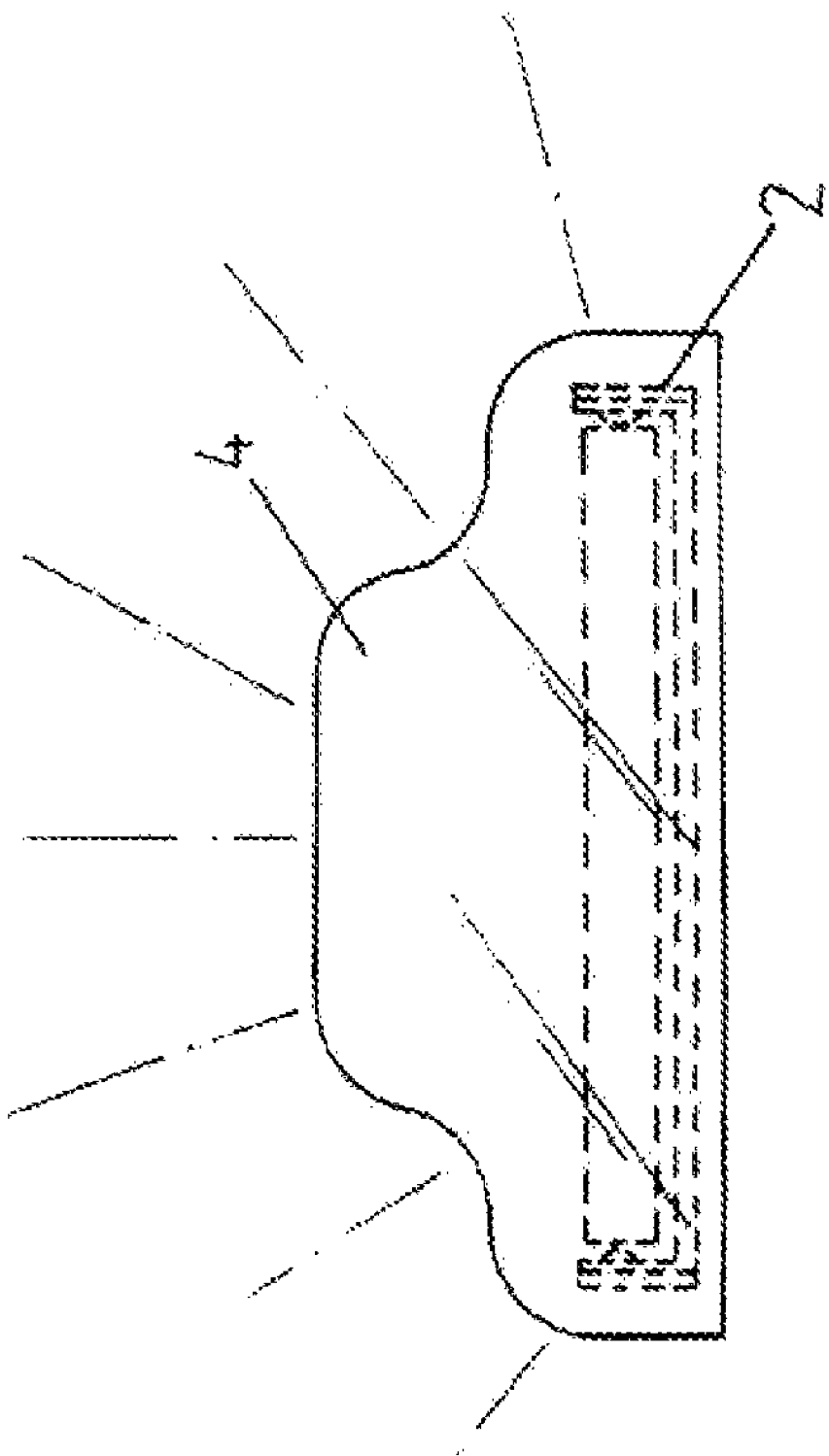
FIG. 10 is a schematic view showing installation of license plate in accordance with the present invention.
Figure 11:
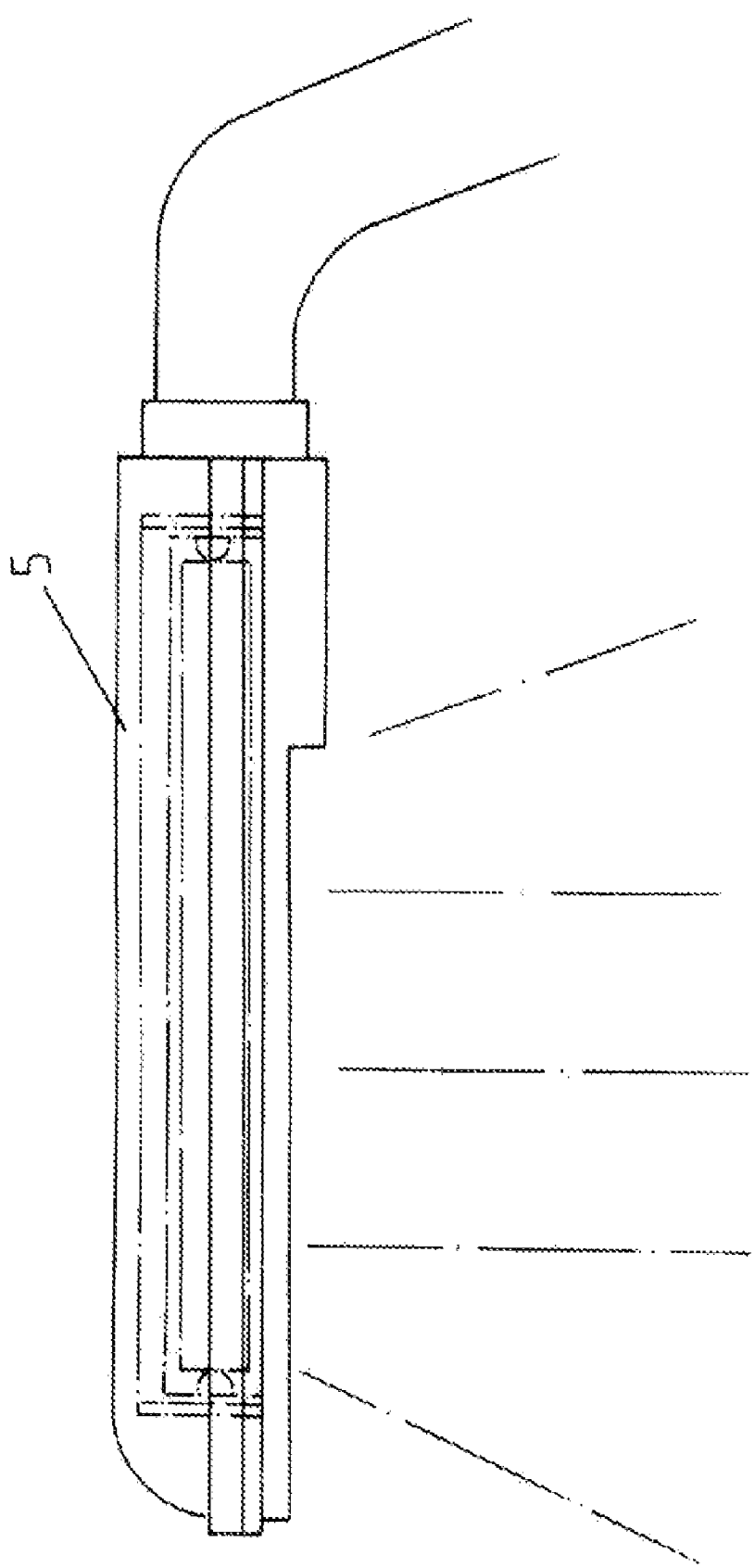
FIG. 11 is a schematic view showing installation of desk lamp in accordance with the present invention.
Figure 12:
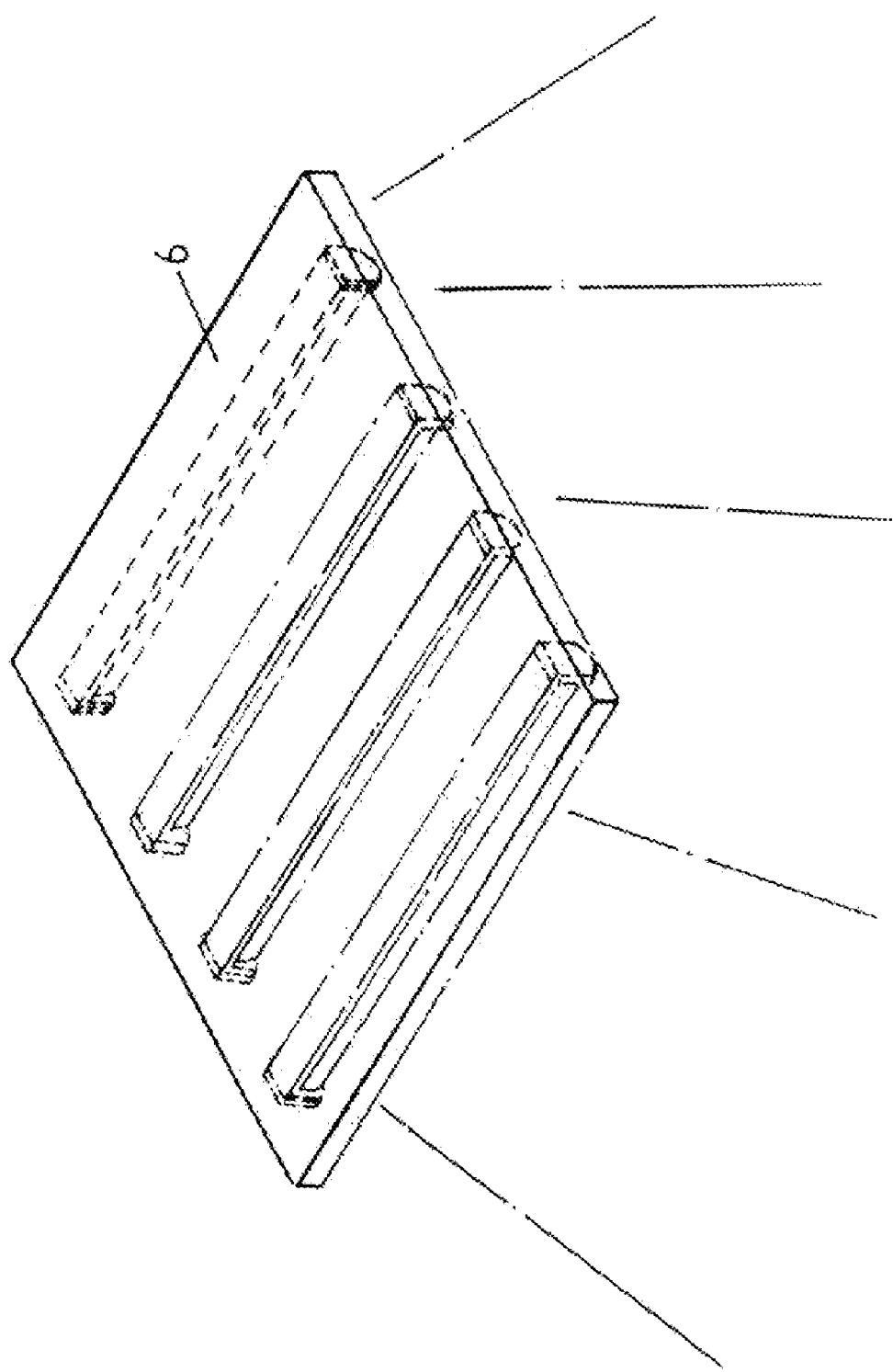
FIG. 12 is a schematic view showing fluorescent lamp in accordance with the present invention.

With reference to FIGS. 10, 11 and 12, these are the applications of the LED lighting equipment and heat radiating structure in accordance with the present invention. It shows all applications to the license plate lamp 4 for the taxi 4, desk lamp 5, and fluorescent lamp 6 or advertising space lighting equipments. According to these implementation charts, it has been found that all of these lighting equipments are capable of achieving objectives of energy saving, low temperature and safety as well as enhancing effectiveness of illumination at the same time.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An LED lighting equipment and heat radiating structure, comprising a lamp holder/bracket and a heat conduction base;
   the lamp holder/bracket consisting of a light-transferring pole and an LED circuit board;
   said light-transferring pole has a cylinder structure, wherein an internal surface of the cylinder structure is a one-piece molding structure and equipped with a reflective film;
   said LED circuit board has an electrical channel connecting to a LED lamp;
   the back end of said LED circuit board having a heat-transfer material extending to an external surface of said circuit board and combined with said heat conduction base;
   the heat conduction base having heat radiating lines set up at its outer edge and being connected at one of two sides of a base having heat lines thereof;
   the heat conduction base having a heat conductor installed at a location corresponding to the heat-transfer material at the back end of the LED lamp;
   a top end of said heat conductor is pushing upward against said heat-transfer material thereto; and
   hereby, high temperatures generated by the LED lamp are absorbed by the heat conductor, also being rapidly radiated out of the LED lamp via numerous heat lines constructed by said heat conduction base, a main body of the base and an outer edge thereof, and hence achieving the effects of energy saving and safety with function of temperature reduction thereof.

2. The LED lighting equipment and heat radiating structure as claimed in claim 1, wherein said heat conduction base and said heat conductor belong to one piece molding structure design.

3. The LED lighting equipment and heat radiating structure as claimed in claim 1, wherein the outer surfaces of said heat conduction base and said base are smooth planes.

4. The LED lighting equipment and heat radiating structure as claimed in claim 1, wherein a cavity is equipped at the external edge of said heat-transfer material, which is matching with a cambered surface of the heat conductor.

5. The LED lighting equipment and heat radiating structure as claimed in claim 1, wherein said heat conduction base is made from a material with an excellent heat radiating effect.

6. The LED lighting equipment and heat radiating structure as claimed in claim 5, wherein said heat conduction base is made from aluminum.

7. The LED lighting equipment and heat radiating structure as claimed in claim 5, wherein said heat conduction base is made from ceramics.

8. The LED lighting equipment and heat radiating structure as claimed in claim 5, wherein said heat conduction base is made from copper metal.

9. The LED lighting equipment and heat radiating structure as claimed in claim 1, wherein said light-transferring pole has a plurality of refractive angles formed at corresponding positions to the light reflective film.

10. The LED lighting equipment and heat radiating structure as claimed in claim 1, wherein the electric energy for said LED circuit board is supplied from a solar energy converter which is connected to a solar energy plate.

* * * * *